(12) United States Patent
Segler et al.

(10) Patent No.: US 8,272,744 B2
(45) Date of Patent: Sep. 25, 2012

(54) LED PACKAGE HAVING IMPROVED LIGHT COUPLING EFFICIENCY FOR AN OPTICAL SYSTEM AND METHOD OF MANUFACTURE THEREOF

(75) Inventors: Dana F. Segler, Allen, TX (US); Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 478 days.

(21) Appl. No.: 12/200,594

(22) Filed: Aug. 28, 2008

(65) Prior Publication Data

US 2010/0053560 A1 Mar. 4, 2010

(51) Int. Cl.
*G03B 21/00* (2006.01)
(52) U.S. Cl. .............. 353/31; 353/30; 353/33; 353/37; 353/38; 353/99; 353/119; 353/122; 257/84; 257/98
(58) Field of Classification Search .............. 353/30, 353/31, 33, 37, 38, 99, 119, 122; 257/84, 257/98; 345/82, 697, 211, 212, 213, 214, 345/31, 32, 33, 34, 35, 36, 38, 39, 84, 30; 348/602, 801; 362/309
See application file for complete search history.

(56) References Cited

U.S. PATENT DOCUMENTS

| | | | | |
|---|---|---|---|---|
| 7,942,559 B2 * | 5/2011 | Holder et al. | ............ | 362/311.06 |
| 2004/0218390 A1 * | 11/2004 | Holman et al. | ............... | 362/245 |
| 2005/0117062 A1 * | 6/2005 | Chien et al. | .................... | 348/602 |
| 2005/0128436 A1 * | 6/2005 | Matsui | ............................. | 353/31 |
| 2005/0128441 A1 * | 6/2005 | Morgan | ........................ | 353/102 |
| 2005/0270493 A1 * | 12/2005 | Nakamura | ...................... | 353/31 |
| 2006/0038188 A1 * | 2/2006 | Erchak et al. | ................... | 257/82 |
| 2006/0044952 A1 * | 3/2006 | Penn et al. | .................. | 369/30.01 |
| 2006/0066540 A1 * | 3/2006 | Hewlett et al. | .................. | 345/84 |
| 2006/0109434 A1 * | 5/2006 | Penn et al. | ..................... | 353/122 |
| 2006/0203468 A1 | 9/2006 | Beeson et al. | | |
| 2008/0173883 A1 * | 7/2008 | Hussell et al. | .................. | 257/98 |
| 2011/0188002 A1 * | 8/2011 | Park et al. | ........................ | 353/33 |

* cited by examiner

*Primary Examiner* — William C Dowling
*Assistant Examiner* — Sultan Chowdhury
(74) *Attorney, Agent, or Firm* — Warren L. Franz; Wade J. Brady, III; Frederick J. Telecky, Jr.

(57) ABSTRACT

One aspect of an LED package, which is covered by this disclosure, includes at least two LED emitters located on a substrate wherein each of the at least two LED emitters forms an emitting area. The emitting area is substantially equal to a reflective area of the LED package, and the LED package has an optical axis that is substantially non-parallel to an optical axis of each of the at least two LED emitters.

10 Claims, 5 Drawing Sheets

LED PACKAGE HAVING IMPROVED LIGHT COUPLING EFFICIENCY FOR AN OPTICAL SYSTEM AND METHOD OF MANUFACTURE THEREOF

TECHNICAL FIELD

The disclosure is directed to an LED (light-emitting diode) package having improved light coupling efficiency for an optical system and a method for manufacturing that LED package and optical system.

BACKGROUND

The LED has gained wide use in illumination technologies with a wide variety of applications, such as watches, calculators, remote controls, indicator lights, and backlights for many common devices and household devices. The technology is advancing at a rapid pace and new applications continue to emerge as the brightness and efficiency of LEDs increase.

LEDs typically include a PN junction diode semiconductor that emits photons when voltage is applied. This process of photon emission is called injection electroluminescence and occurs when electrons move from the N-type material to fill the lower energy holes that exist in the P-type material. When the high energy electrons fall into these holes, they lose some of their energy which results in the generation of photons. The materials used for the p-type and n-type layers along with the size of the gap between them determine the wavelength and overall energy level of the light that is produced.

Recent innovations in the manufacturing of the die material and packaging have resulted in ultra high brightness capabilities. The use of new materials for the substrate has allowed for improved thermal conductivity that allows for higher power consumption and net light output. This increase in light output has enabled new application for LEDs, such as automotive lighting, traffic signals, and more recently television displays.

Improvements in the types of material used to construct the LED have allowed for improved brightness. These improvements enable system designs that can produce better color fidelity at near equivalent brightness to common lamp-based technologies with longer lifetimes, which makes their application well suited to applications using a digital micromirror device (DMD).

As LED technology developments continue to improve brightness and reliability, LED illumination may become more of a mainstream light source for many future applications. Future developments will be able to take further advantage of the fast LED switching time to improve video performance, enhance contrast without opto-mechanical components, and create adjustable color gamuts that far exceed the possibilities of traditional illumination sources.

SUMMARY

One embodiment provides an optical system, comprising an LED package having a package optical axis. In this embodiment, the LED package includes LED emitters located on a substrate wherein each of the LED emitters includes a reflective surface and a p/n junction located over the reflective surface and an emitting area located over the p/n junction. The LED emitters have a total emitting area, wherein the total emitting area is substantially equal to a total reflective area of the LED package and the optical output of the LED package is substantially non-lambertian. The optical system further includes a collimating lens located to receive an optical output from the LED package, an optical integrator located to receive an optical output from the collimating lens, a spatial light modulator located to receive an optical output from the optical integrator, and a projection lens located to receive an optical output from the spatial light modulator.

Another embodiment provides an LED package that includes at least two LED emitters located on a substrate wherein each of the at least two LED emitters collectively forms an emitting area. The emitting area is substantially equal to a reflective area of the LED package, and the LED emitters are positioned on the substrate such that the emitting area and the LED package have an optical axis substantially non-parallel to an optical axis of the LED emitters.

Another embodiment provides a method of manufacturing an optical system. This embodiment includes providing first, second, and third LED packages each having a package optical axis. Each package includes LED emitters located on a substrate wherein each of the LED emitters includes a reflective surface and a p/n junction located over the reflective surface and an emitting area located over the p/n junction. The LED emitters have a total emitting area, where the total emitting area is substantially equal to a total reflective area of the LED package. The LED emitters also are positioned on the substrate such that the total emitting area and the LED package have an optical axis substantially non-parallel to an optical axis of the LED emitters. The method further includes positioning a collimating lens in an optical path of each of the LED packages to receive an optical output therefrom, positioning an optical integrator in an optical path of the collimating lens to receive an optical output from each of the collimating lenses, positioning a spatial light modulator in an optical path of the integrator to receive an optical output from the optical integrator, and positioning a projection lens in an optical path of the spatial light modulator to receive an optical output from the spatial light modulator.

Another embodiment provides a method of manufacturing an LED package that includes positioning LED emitters on a substrate wherein the LED emitters are positioned on the substrate such that the total emitting area and the LED package have an optical axis substantially non-parallel to an optical axis of the LED emitters.

BRIEF DESCRIPTION OF DRAWINGS

The disclosure is described with reference to example embodiments and to accompanying drawings, wherein.

DETAILED DESCRIPTION

The embodiments as discussed herein provide an LED package and method of manufacture thereof that improves illumination intensity and light coupling efficiency without increasing etendue and that can be accomplished without the use of a lens. In certain embodiments, these benefits may be achieved by positioning two or more LEDs on a substrate so that they are angled with respect to each other. The resulting total emitting area of the emitters is substantially equal to the total reflective area of the emitters; that is a smaller, additional substrate reflective area equal to the thickness dimension of the emitter times the dimension of adjacency between emitters may also be present. The LEDs are positioned on the substrate such that the total emitting area and the LED package have an optical axis that is substantially non-parallel to an optical axis of the LED emitters.

Figure 1:
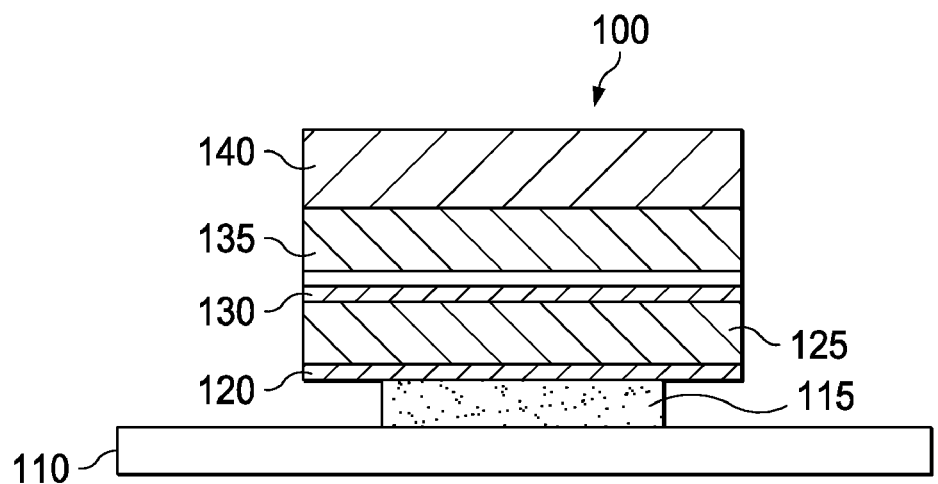
FIG. 1 illustrates an emitter that can be used in the embodiments of this disclosure.

FIG. 1 illustrates an emitter 100 that can be used in the embodiments disclosed herein. The emitter 100 may be attached to a substrate 110 with an epoxy material 115, which may be a conventional epoxy or soldered to an electrically conductive contact on the substrate. The substrate 110 is totally or substantially non-reflective and may be a conventional thermally conductive material, such as co-fired ceramic on copper.

The emitter 100 may be a conventional LED emitter. Thus, conventional processes and materials may be used to construct the emitter 100. In such embodiments, the emitter 100 includes a reflective surface 120, a semiconductive layer 125 located over the reflective surface 120, a quantum well 130 located over the semiconductive layer 125, another semiconductive layer 135 located over the quantum well 130, and a metal oxide layer 140 located over the semiconductive layer 135. As used herein, "over" includes configurations where the layers are located on each other, as illustrated, as well as those that are not located directly on each other.

The reflective surface 120 may comprise conventional materials, such as gold, silver or aluminum. During operation, the reflective surface 120 reflects photon emissions that emanate from the quantum well 130, which increases illumination from the emitter 100. The role of the reflective surface 120 is discussed in more detail below. The semiconductive layers 125 and 135 form a P/N junction. Thus, one of the semiconductive layers 125, 135 includes a p-type dopant, and the other includes an n-type dopant, such as arsenic or phosphorous. A wide range of semiconductor materials may be used to form layers 125, 135, depending on the intended color of light emanating from the LED. For example, aluminum gallium arsenide or gallium arsenide phosphide may be used to produce red light, while aluminum gallium phosphide, aluminum gallium indium phosphide, gallium phosphide or gallium nitride may be used to produce green light and gallium nitride or indium gallium nitride may be used to produce blue light. These are given as examples only and other semiconductor materials may also be used to fabricate the emitter 100. Conventional materials, such as gallium arsenide, may be used to construct one or more layers that make up the quantum well 130, and materials, such as aluminum oxide, may be used to form the metal oxide layer 140.

Figure 2:
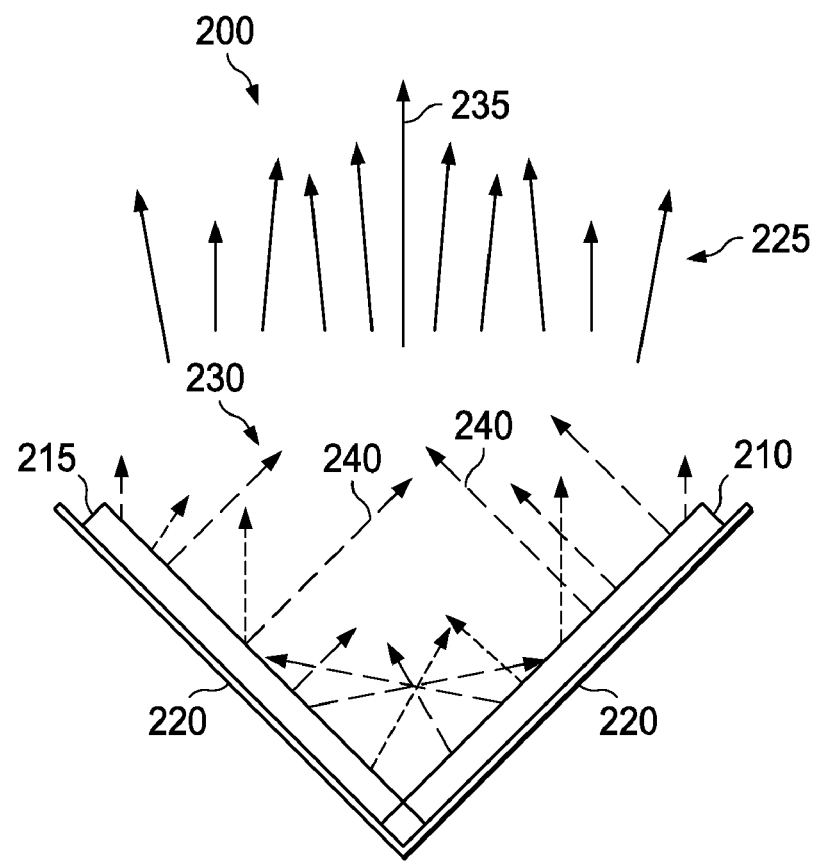
FIG. 2 illustrates one embodiment of an LED package covered by this disclosure.

Once constructed, a plurality of emitters like the emitter 100 may be attached to the package substrate 110 and arranged in a number of configurations to form an LED package. One embodiment is illustrated in FIG. 2. FIG. 2 shows an LED package 200 that includes emitters 210, 215, which are schematically shown, arranged in a "V"-shape configuration and mounted on a substrate 220 of the LED package 200. In this particular embodiment, the emitters 210, 215 may be separated by an angle of less than 90 degrees, or in other embodiments, the emitters 210, 215 may be separated by an angle of 90 degrees. Such configurations provide an improvement in the coupling efficiency of the LED package 200. For example, modeling concepts have shown that the coupling efficiency can be increased by as much as 25% or more when the angle between the emitters 210, 215 is approximately 60 degrees. Additionally, the embodiment shown in FIG. 2 allows for recapture of some light that would otherwise be wasted, thereby increasing the illumination of the LED package 200.

It should be noted that in this embodiment, as well as others discussed herein, the total reflective surface of the LED package 200 is substantially equal to the total emitting area of the emitters 210, 215. That is, most of the reflections that occur within the LED package occur as the result of light being reflected off the reflective surface 120 (see FIG. 1) of each of the emitters 210, 215 and not off the substrate 220 of the LED package 220, though a minor portion of the reflections may be from the substrate 220. This percentage of light being reflected from the reflective surface 120 may be expressed as (percentage=emitter area/(emitter area+thickness of the emitter×width of the emitter)). This is an improvement over other conventional devices that include other reflective surfaces within the LED package.

In such conventional devices, substantial reflections and recycling of light within the LED package causes the light to be directed away from the LED package aperture, which decreases optical efficiency and produces more heat. However, these deficiencies are reduced in the embodiments covered by this disclosure because the total reflective area of the LED package 200 is substantially equal to the emitting area of the LEDs 210, 215. This provides a device in which recycling of light is reduced, and more light 225 is directed to the LED aperture 230 and emitted from the LED package 200. In addition, the LED package 200 produces less heat.

The configuration shown in FIG. 2 provides the LED package 200 that has an optical axis 235 that is substantially non-parallel to an optical axis 240 of the emitters 210, 215. The optical axis 240 of the emitters 210, 215 is the axis along which a predominant amount of the emitted light is in a direction normal to the surface of the emitter. Though a minor portion of the emitted light may be parallel, a major portion of the light emanates along the optical axis 240. The optical axis 235 of the LED package 200 is the axis along which a predominant amount of the emitted light is transmitted through the aperture. Due to the increase in the total available emitted light as created by the non-parallel configuration of the multiple emitters, more light is emitted from the total LED package 200.

Figure 3:
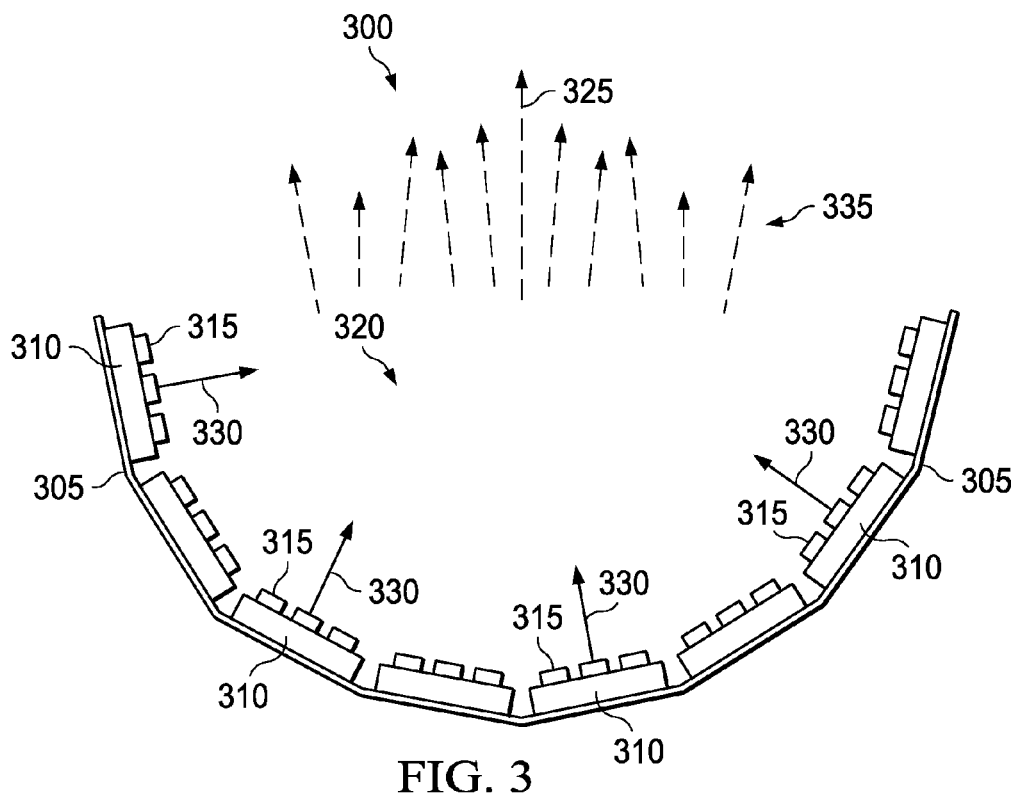
FIG. 3 illustrates another embodiment of an LED package covered by this disclosure.

FIG. 3 shows another embodiment of an LED package 300 wherein the substrate 305 of the LED package 300 has an overall concave or general curved configuration. Though the illustrated embodiment has a relatively deep degree of concavity, other configurations may have much shallower degrees of concavity. The LED package 300 includes a plurality of LED dies 310 on which a plurality of emitters 315 may be formed. The LED dies 310 on which the emitters 315 are located may be attached to the substrate 305 with an epoxy as mentioned above. In this embodiment, the LED dies 310 are positioned on the substrate such that they are separated by an angle that is greater than 90 degrees. The concave configuration may be formed by joining multiple substrates together, and the degree of concavity can be governed by the number of LED dies 310 that are required for the specified luminescence. For example, the LED package 300 may have as few as two or three LED dies 310 located on the substrate 305. In such instances, the concavity may be shallower than that shown in FIG. 3.

Like the embodiment of FIG. 2, the total reflective surface of LED package 300 is substantially equal to the emitting area of the emitters 315. That is, most of the reflections that occur within the LED package 300 occur as the result of light being reflected off the reflective surface 120 (see FIG. 1) of each of the emitters 315 and not off the substrate 305 of the package 300, though a minor portion of light may be reflected from the substrate 305. This is an improvement over conventional devices that include other reflective surfaces within the LED package. As with the embodiment discussed regarding FIG. 2, the recycling of light is reduced and more light is directed to an aperture 320 of the LED package 300.

The configuration shown in FIG. 3 also provides an LED package 300 that has an optical axis 325 that is substantially non-parallel to an optical axis 330 of the emitters 315. The optical axis 330 of the emitters 315 is the axis along which a predominant amount of the emitted light is in a direction normal to the surface of the emitter 315. Though a minor portion of the emitted light may be parallel, a major portion of the light emanates along the optical axis 330. The optical axis 325 of the LED package 300 is the axis along which a predominant amount of the emitted light is transmitted through the aperture 320 of the LED package 300. Due to the increase in the total available emitting area and, therefore, total emitted light as created by the non-parallel configuration of the multiple emitters, more light 335 is emitted from the total LED package 300 and the overall output luminance is increased.

Figure 4:
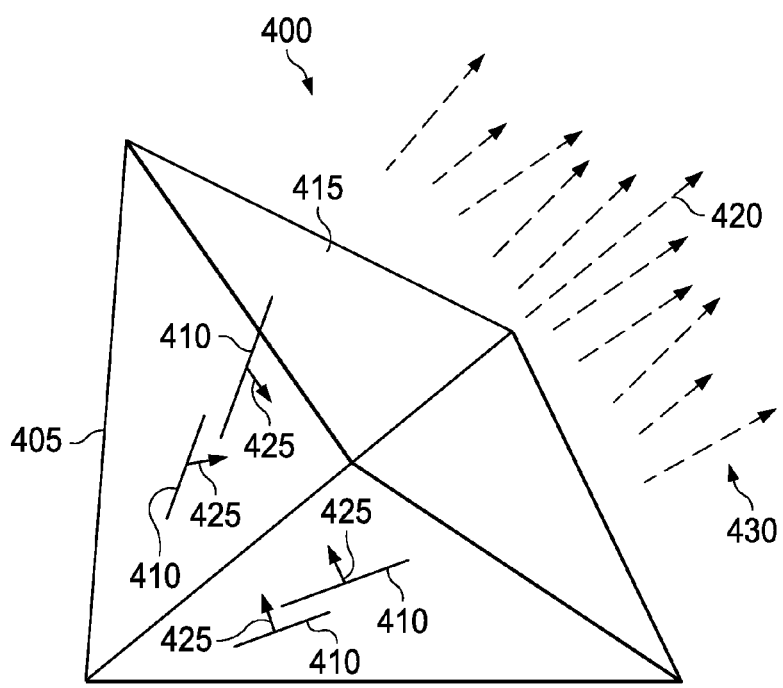
FIG. 4 illustrates another embodiment of an LED package covered by this disclosure.

FIG. 4 shows another embodiment of an LED package 400 wherein the substrate 405 of the LED package 400 has an overall pyramid configuration. The LED package 400 may also include a plurality of LED dies 410 on which one or more emitters, such as those discussed above, may be located. However, the LED die 410 and emitter, which may be located on each internal surface of the pyramid, are only schematically shown for clarity. The LED dies 410 may be attached to the substrate 405 with an epoxy as mentioned above. The degree of angular separation between the LED dies 410, and thus the emitters, will depend on the angularity that separates each face of the pyramid. For example, the degree of angular separation may be less than 90 degrees, and in certain embodiments may range from 60 degrees to 45 degrees. The pyramidal shape may be formed by joining multiple substrates 405 together.

Like the embodiments of FIGS. 2 and 3, the total reflective surface of LED package 400 is substantially equal to the emitting area of the emitters. That is, most of the reflections that occur within the package 400 occur as the result of light being reflected off the reflective surface 120 (see FIG. 1) of each of the emitters and not off the substrate 405, though a minor portion of light may be reflected from the substrate 405. This is an improvement over conventional LED packages that include other reflective surfaces within the package. As with the embodiments discussed regarding FIGS. 2 and 3, the recycling of light is reduced and more light is directed to an aperture 415 of the package 400.

The configuration shown in FIG. 4 also provides a package 400 that has an optical axis 420 that is substantially non-parallel to an optical axis 425 of the emitters. The optical axis 425 of the emitters is the axis along which a predominant amount of the emitted light is in a direction normal to the surface of the emitter. A minor portion of the emitted light may be parallel but a major portion of the light emanates along the optical axis 425. The optical axis 420 of the package 400 is the axis along which a predominant amount of the emitted light is transmitted through an aperture 415 having an axis normal to the package 400. Due to the increase in the total available emitted light as created by the non-parallel configuration of the multiple emitters, more light 430 is emitted from the package 400 and overall luminance is increased.

Figure 5A:
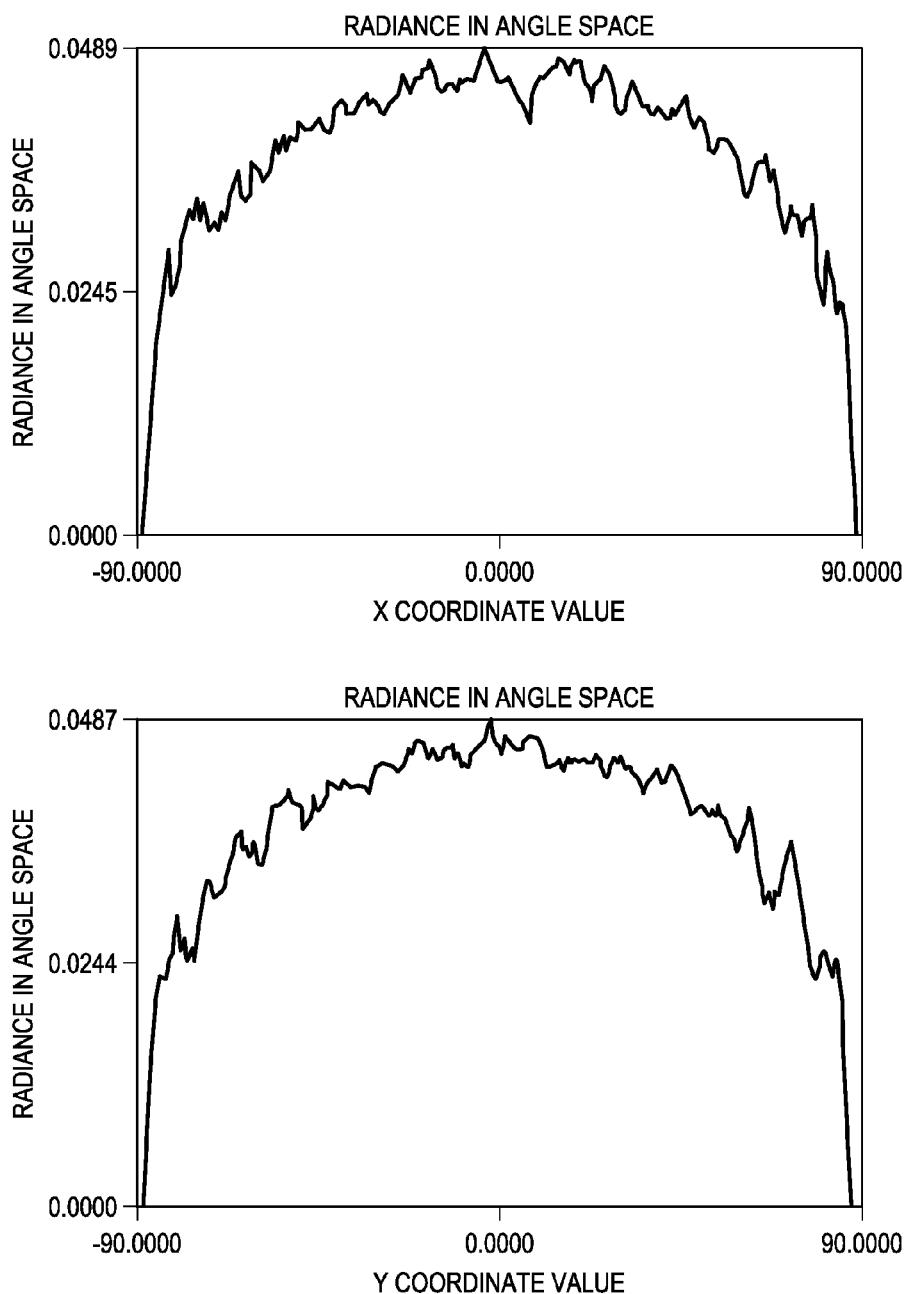
FIGS. 5A-5B illustrate a comparative example of lambertian and non-lambertian optical outputs of a simulated one LED device and a simulated two LED device, respectively.
Figure 5B:
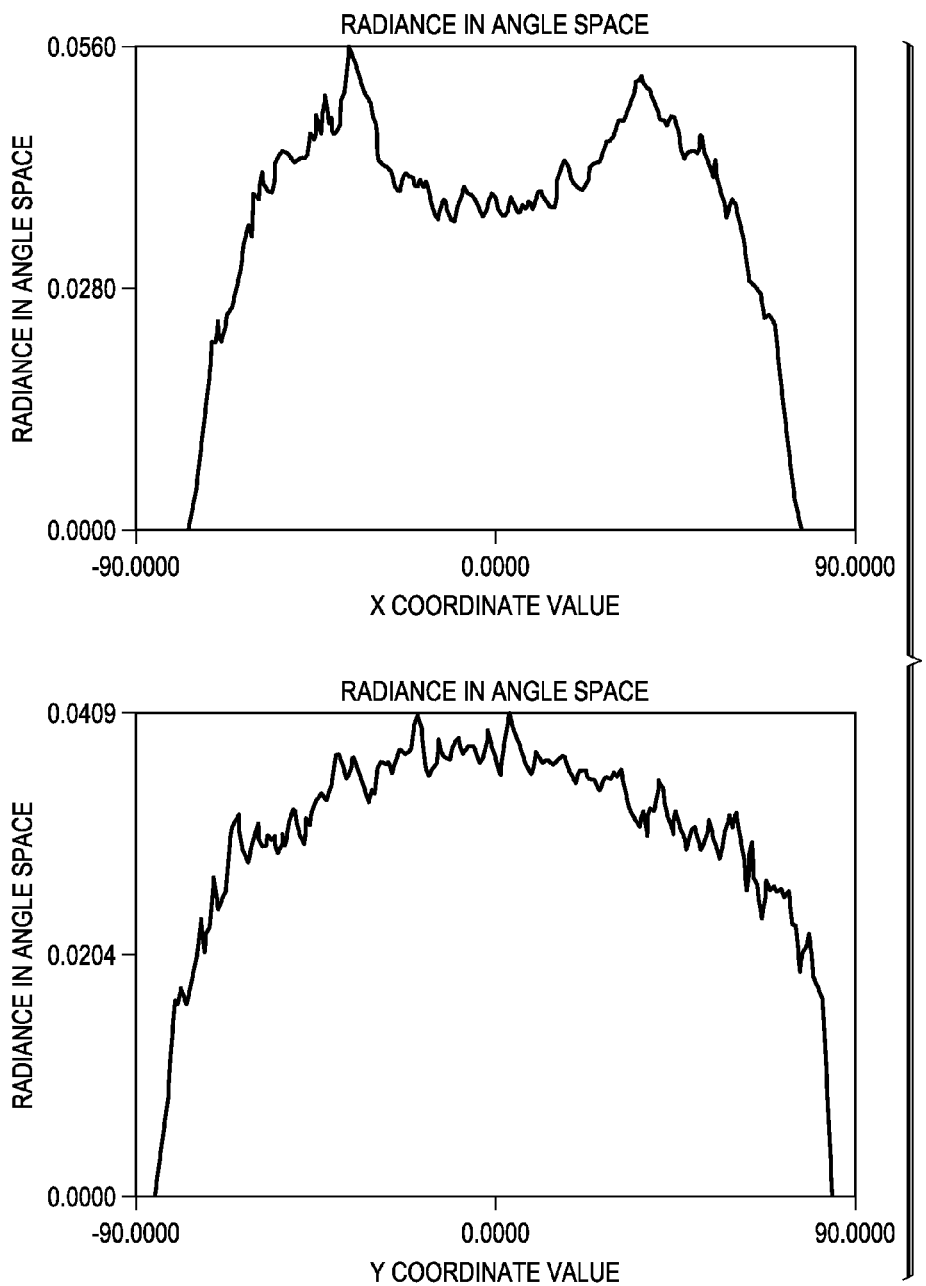

In another aspect of the embodiments described above, the optical output of the LED packages 200, 300 and 400 may also be substantially non-lambertian. Lambertian optical output occurs where light emanating from the LED package is scattered such that the overall apparent brightness of the LED package to an observer is substantially the same regardless of the observer's angle of view. More technically, the LED's luminance is substantially isotropic. A comparative example of lambertian and non-lambertian optical outputs is illustrated in FIGS. 5A and 5B. FIG. 5A shows the X and Y axis of simulated radiant output of a single LED. The single LED has a lambertian light distribution along both the X and Y axis. In contrast, FIG. 5B shows the X and Y axis of a simulated radian output of two LEDs. The two-LED package has two higher brightness peaks that are closer to the 0-x coordinate (the optical axis of the package). In FIG. 5B, since the brightness peaks are closer to the optical axis, more usable light is collected and relayed.

In the embodiments presented herein, the output distribution dimensions of the LED package and aperture may be optimized to match the input properties of a given optical system. The configurations of the various embodiments of the LED packages presented herein are not to be considered exhaustive, but simply as examples of how one skilled in the art can design an optimized configuration using the proposed technique to improve overall luminance output.

Figure 6:
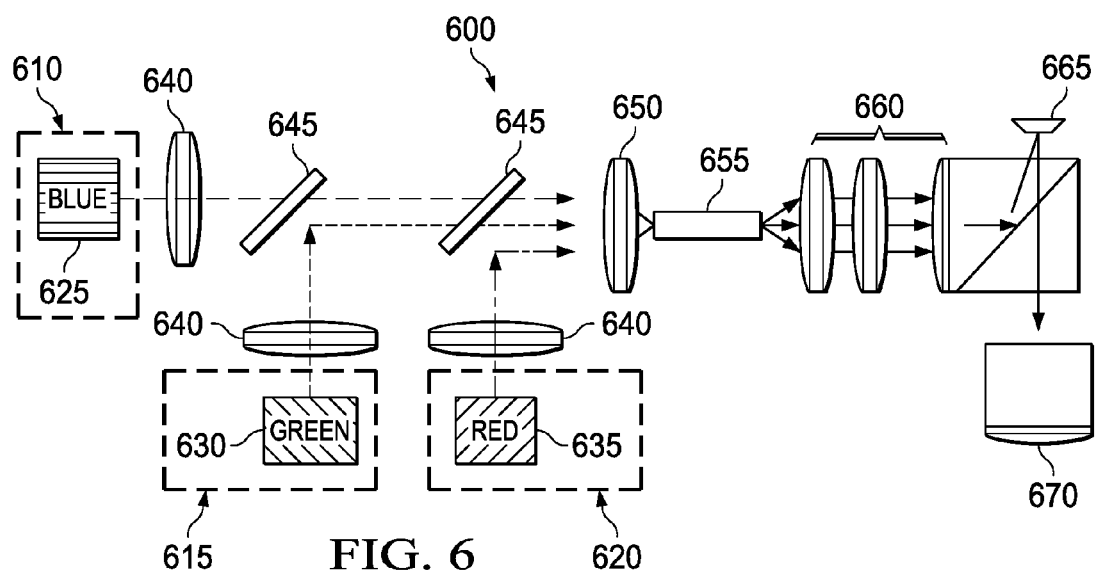
FIG. 6 illustrates an optical system into which the LED package of this disclosure may be incorporated.

FIG. 6 illustrates an optical system 600 in which various embodiments of the LED packages disclosed herein may be used. In one embodiment, the optical system 600 includes at least three LED packages 610, 615, 620, each having a package optical axis as described above. The LED packages 610, 615, 620 may be provided by either the manufacturer building the LED package, or it may be obtained from an external source. Each of the LED packages 610, 615, 620, includes LED emitters 625, 630, 635, which may include an emitter as described above. Each of the LED emitters 625, 630, 635 may include a plurality of emitters that are grouped to form an array. The arrays may be separately configured to produce a different wavelength of light. For example, emitters 625 may be configured to produce red light, emitters 630 may be configured to produce green light and emitter 635 may be configured to produce blue light. A collimating lens 640 is located adjacent the output aperture of each of the LED packages 625, 630, 635 to receive an optical output from each of the packages 625, 630, 635. The optical system may further include dichroic filters 645. A condenser lens 650 is positioned in an output path of the dichroic filters 645 to focus the optical outputs of LED packages 625, 630, 635 to an optical integrator 655. A lens array 660 may also be included to focus the output light of the optical integrator 555 to a spatial light modulator 665, such as a conventional digital micromirror device (DMD). The output light from light modulator 665 is then transmitted to a projection lens 670 that creates a magnified image of the DMD on some external surface. Conventional process and skills may be used to assemble the components into a functioning optical system 600.

Those skilled in the art to which the disclosure relates will appreciate that other and further additions, deletions, substitutions, and modifications may be made to the described example embodiments, without departing from the disclosure.

What is claimed is:
1. A light-emitting diode (LED) package, comprising:
   first and second die mounted at an angle with respect to each other in a V-shape configuration on a substrate, each die including a semiconductor light-emitting diode having a PN junction that emits photons when voltage is applied, each die having a light-emitting area over the PN junction and being formed with the PN junction located over a reflective surface having a reflective area substantially equal to the light-emitting area, and each die defining a die optical axis along which a predominant amount of light is emitted in a direction normal to a surface of the light-emitting area;

wherein the opening of the V-shape configuration defines an aperture, and the die are relatively configured and dimensioned so that their respective die optical axes are non-parallel with respect to each other and with respect to an aperture optical axis defined in a direction along which a predominant amount of emitted light is transmitted through the aperture.

2. The package of claim 1, wherein the angle is 90 degrees or less.

3. The package of claim 2, wherein the angle is approximately 60 degrees.

4. The package of claim 2, wherein each die further includes a metal oxide layer located over the PN junction.

5. The package of claim 4, wherein the metal oxide is aluminum oxide.

6. The package of claim 4, wherein the reflective surface is a metallic surface that comprises at least one of gold, silver or aluminum.

7. The package of claim 6, wherein the package is configured to provide a substantially non-lambertian optical output.

8. The package of claim 1, wherein the angle is approximately 60 degrees; and wherein the reflective surface comprises a metallic reflective surface.

9. The package of claim 1, wherein the V-shape configuration of the first and second die is a first V-shape configuration; and the package further comprises third and fourth die mounted at an angle with respect to each other in a second V-shape configuration on the substrate, each of the third and fourth die also including a semiconductor light-emitting diode having a PN junction that emits photons when voltage is applied, each of the third and fourth die also having a light-emitting area over the PN junction and being formed with the PN junction located over a reflective surface having a reflective area substantially equal to the light-emitting area, and each of the third and fourth die also defining a die optical axis along which a predominant amount of light is emitted in a direction normal to a surface of the light-emitting area;

wherein the second V-shape configuration is rotated about the first V-shape configuration aperture optical axis with respect to the first V-shape configuration so that the first and second V-shape configurations together present an overall pyramid configuration, wherein the opening of the pyramid configuration defines a pyramid configuration aperture, and the first, second, third and fourth die are relatively configured and dimensioned so that their respective die optical axes are non-parallel with respect to each other and with respect to a pyramid configuration aperture optical axis defined in a direction along which a predominant amount of emitted light is transmitted through the pyramid configuration aperture.

10. An optical system, comprising:
a light-emitting diode (LED) package, comprising:
    first and second die mounted at an angle with respect to each other in a V-shape configuration on a substrate, each die including a semiconductor light-emitting diode having a PN junction that emits photons when voltage is applied, each die having a light-emitting area over the PN junction and being formed with the PN junction located over a reflective surface having a reflective area substantially equal to the light-emitting area, and each die defining a die optical axis along which a predominant amount of light is emitted in a direction normal to a surface of the light-emitting area;
    wherein the opening of the V-shape configuration defines an aperture, and the die are relatively configured and dimensioned so that their respective die optical axes are non-parallel with respect to each other and with respect to an aperture optical axis defined in a direction along which a predominant amount of emitted light is transmitted through the aperture;
a collimating lens located to receive light emitted along the aperture optical axis from the LED package;
an optical integrator located to receive the light output from the collimating lens;
a spatial light modulator located to receive the light output from the optical integrator; and
a projection lens located to receive the light output from the spatial light modulator.

* * * * *